Dec. 26, 1967  C. W. POWERS  3,359,582
DIE ASSEMBLY FOR MAKING CHAMFER HEADED NAILS
Filed Nov. 22, 1965
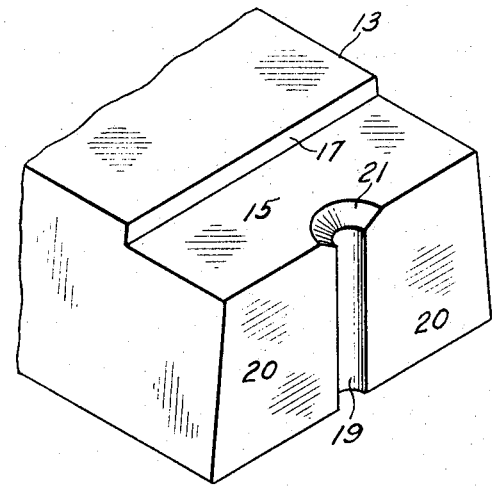
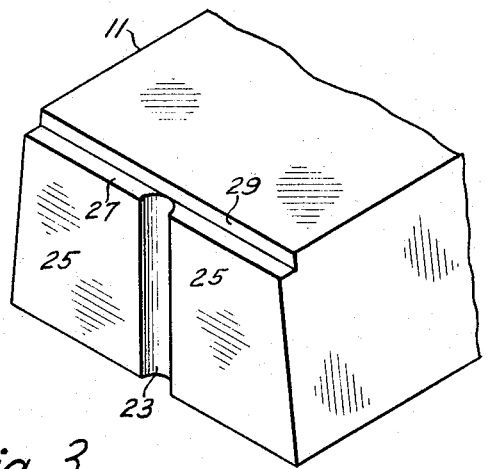
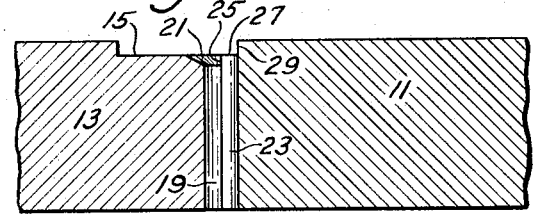
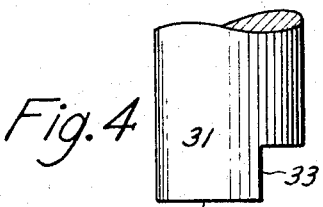
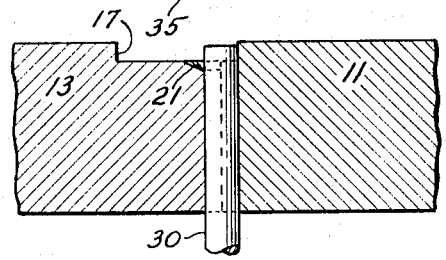
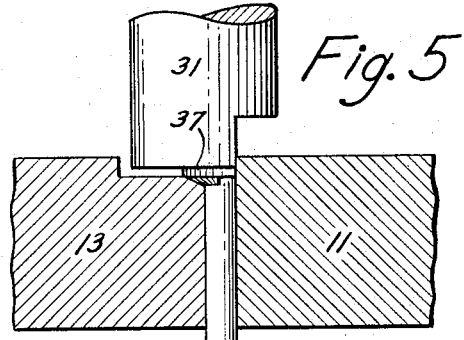
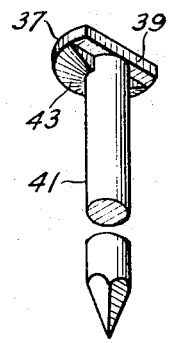
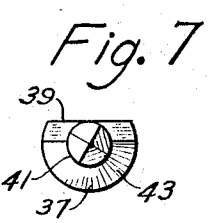
INVENTOR
Charles W. Powers

3,359,582
DIE ASSEMBLY FOR MAKING CHAMFER HEADED NAILS

Charles W. Powers, Baltimore, Md., assignor to Bethlehem Steel Corporation, a corporation of Delaware
Filed Nov. 22, 1965, Ser. No. 509,120
2 Claims. (Cl. 10—53)

This invention relates to the forming of heads on nails, and more particularly to the forming of chamfer-headed nails, i.e. nails with heads having a generally circular perimeter except for a portion formed along a chord line generally tangent to the shank.

Chamfer-headed nails such as shown in Patent 3,152,334 to H. C. Lingle, issued Oct. 13, 1964, for use in automatic nailing machines have heretofore, as explained in the patent, been formed by making a conventional round headed nail and then removing a portion of the head along the desired chord or other line to provide the shape head desired. This two step operation is obviously wasteful of both operations and material. Attempts have been made to form chamfer-headed nails in a conventional die assembly having a die impression of the desired head shape formed in the upper surfaces of the dies, but such attempts have been unsuccessful because the wire stock cannot be successfully upset to fill the die cavity.

It is an object of the present invention to provide a die assembly in which a chamfer-headed nail can be successfully headed in one operation.

It has been discovered that the foregoing object can be accomplished by the use of a die assembly having the characteristics hereinafter described.

Referring to the drawings:

FIGURES 1 and 2 are isometric views of the gripping die halves of the die assembly of the invention.

FIGURE 3 is a cross-section of the dies of FIGURES 1 and 2 shown together in operative position.

FIGURES 4 and 5 are cross-sections showing in sequence, a chamfered head being formed on a wire held in the gripping dies shown in FIGURE 3.

FIGURES 6 and 7 are isometric and bottom plan views, respectively, of the completed chamfer-headed nail shown being formed in FIGURES 4 and 5.

In the drawings, 11 indicates a stationary gripping die constituting one half of a gripping die assembly and 13 indicates a gripping die movable transversely toward and away from die 11 and constituting the second half of the gripping die assembly. The dies 11 and 13 are mounted in a conventional nail making machine in the usual manner. One such suitable nail machine is shown in Patent No. 1,479,877 to Sleeper but, as will be readily understood, the dies may be adapted to other conventional nail making machines.

Movable die 13 has a top surface 15 and an end surface 20. A semi-cylindrical nail shank gripping groove 19 is formed in the end surface 20 of die 13, passing completely through the die. At the top of groove 19 in top surface 15 is a nail head forming depression 21 which during formation of the nail forms a fillet 43 on the bottom of the nail head.

Stationary die 11 has a top surface 27 and an end surface 25. A semi-cylindrical nail shank gripping groove 23 is formed in its end surface 25, passing completely through the die section. The top surface 27 of stationary die 11 is provided with a shoulder 29 tangent to the edge of gripping groove 23 and parallel to the end surface 25.

Dies 11 and 13, when die 13 is moved toward die 11, fit together as shown in FIGURE 3 with their respective end surfaces 25 and 20 abutting, and their top surfaces 15 and 27 aligned. The depression 21 in die 13, which depression forms the fillet of the nail head, is not continued into die 11, see FIGURE 3. A portion of end surface 25 of die 11 provides the vertical end walls for fillet forming depression 21 when the dies are juxtaposed.

In FIGURE 4 is shown a hammer die 31 having a lateral face 33 parallel to and vertically aligned with shoulder 29 and an end face 35 parallel to the upper surfaces 15 and 27 of dies 13 and 11.

In the operation of the die assembly, the die 13 is moved away from die 11 by the operation of the nail machine, in which the dies are mounted. Wire 30 is inserted, by suitable feeding means associated with the nail machine, between the dies in line with the gripping grooves 19 and 23 with its end protruding slightly above the top surfaces 15 and 27 of dies 13 and 11. Die 13 is then moved back into abutting relationship with die 11, the wire thus being gripped in grooves 19 and 23 as shown in FIGURE 4. Hammer die 31 then descends, as shown in FIGURE 5, and face 35 upsets the protruding upper portion of wire 30 forming a nail head 37.

A completed nail is shown in FIGURES 6 and 7 and comprises a shank 41, a head 37 having a generally circular perimeter 38, extending beyond the shank 41, and a chamfered portion 39 formed in a chord line tangent to shank 41. A fillet 43 forming the bottom of nail head 37 terminates at the center of the nail shank 41. Fillet 43 reinforces the head 27 and prevents detachment from the shank when the nail is struck by a hammer.

After the head 37 is formed on the nail as shown in FIGURE 5, hammer 31 is retracted and the wire 30 forming the shank 41 of the nail is advanced upwardly as is conventional in the art and cut off with suitable cut off dies, not shown, to sever the nail from the succeeding wire and also, at the same time, form a driving point on the shank 41 of the nail.

I claim:

1. A die assembly for making chamfer-headed nails from wire nail stock comprising:
   (a) a pair of gripper dies having abutting end surfaces and aligned top surfaces,
   (b) a groove in the abutting end surface of each die forming an orifice in the die assembly to grip the nail stock,
   (c) a fillet forming depression in the top surface of one of said dies,
   (d) a shoulder extending above the top surface of the other of said dies and tangent to the edge of the gripping orifice, and
   (e) a hammer die having an end surface parallel to the top surfaces of the gripper dies and a lateral surface aligned with the shoulder on said other of said gripping dies.

2. A die assembly in accordance with claim 1 wherein the fillet forming depression and shoulder are spaced from each other.

No references cited.

LEONIDAS VLACHOS, *Primary Examiner.*